(12) United States Patent
Yap et al.

(10) Patent No.: US 6,711,464 B1
(45) Date of Patent: Mar. 23, 2004

(54) APPARATUS AND METHOD FOR DISTRIBUTING AUDIO AND VIDEO CONTENT

(75) Inventors: Sue-Ken Yap, Lane Cove (AU); Zhenya Alexander Yourlo, Roseville (AU)

(73) Assignee: Canon Kabushiki Kaisha, Tokyo (JP)

( * ) Notice: Subject to any disclaimer, the term of this patent is extended or adjusted under 35 U.S.C. 154(b) by 41 days.

(21) Appl. No.: 09/631,952

(22) Filed: Aug. 3, 2000

(30) Foreign Application Priority Data

Aug. 12, 1999 (AU) .............................................. PQ2167

(51) Int. Cl.[7] .............................................. G06F 7/00
(52) U.S. Cl. ........................ 700/233; 700/231; 700/241; 235/380; 235/381
(58) Field of Search .................................. 700/231, 233, 700/234, 236, 241; 221/2, 3, 5, 8, 7; 235/380, 381

(56) References Cited

U.S. PATENT DOCUMENTS

| | | | |
|---|---|---|---|
| 5,633,839 A | | 5/1997 | Alexander et al. ............ 369/30 |
| 5,768,142 A | * | 6/1998 | Jacobs ..................... 700/233 X |
| 5,860,068 A | | 1/1999 | Cook .......................... 705/26 |
| 5,900,608 A | * | 5/1999 | Iida ............................ 235/381 |
| 5,949,688 A | * | 9/1999 | Montoya et al. ............ 700/236 |
| 6,256,554 B1 | * | 7/2001 | DiLorenzo ................... 700/236 |
| 6,330,490 B1 | * | 12/2001 | Kim et al. ............... 700/234 X |

FOREIGN PATENT DOCUMENTS

| | | |
|---|---|---|
| EP | 1039772 | 9/2000 |
| WO | WO 95/35534 | 12/1995 |

OTHER PUBLICATIONS

U.S. patent application Ser. No. 09/801,688 filed Mar. 9, 2001.
U.S. patent application Ser. No. 09/801,687 filed Mar. 9, 2001.

* cited by examiner

Primary Examiner—Gene O. Crawford
(74) Attorney, Agent, or Firm—Fitzpatrick, Cella, Harper & Scinto

(57) ABSTRACT

A system (128) for distributing at least one item from a set of media content items is disclosed. The system comprises the set of media content items, which can be warehoused in a vending machine (112) or in a remote server (524). The system further comprises a portable storage device (100) having at least one user selectable icon (104) and an associated reference pointer to a corresponding media content item in the set. Also, the system comprises the vending machine (112), which is responsive to a signal from the portable storage device (100), the signal being dependent upon a user selection of the icon (104). The vending machine is capable of locating the corresponding media content item, and reproducing the item on an output medium (118).

13 Claims, 5 Drawing Sheets

APPARATUS AND METHOD FOR DISTRIBUTING AUDIO AND VIDEO CONTENT

FIELD OF THE INVENTION

The present invention relates to the field of distribution of audio, video and multi-media content associated with the areas of entertainment and education for example. In particular, the invention relates to distribution of such content in a manner which provides for both user control, or customisation, of the content, and also for ensuring that an appropriate payment is charged and collected for the content reproduction.

BACKGROUND

Currently, distribution of audio and video content, eg. pre-recorded music and video selections, is typically done using physical media such as compact discs (CDs) for audio, or video cassettes for video. With these media, a content owner is assured of payment by means of both copyright protection, and by controlling the physical means of distribution directly or through agents.

An emerging method for distributing content is the Internet, by means of which encoded files using, for example, the MPEG 1 audio layer 3 (MP3) standard, are distributed and downloaded. This method can potentially broaden and extend current distribution channels, however it poses severe difficulties to content owners in terms of both vulnerability to copying without appropriate compensation being paid, and in regard to difficulty in the enforcement of copyright.

Distribution of content using current physical media does not typically offer a customer the option to be selective in what is purchased. Therefore, although a customer may wish to buy a recording of a number of songs from a particular artist, an available CD may, while containing some of the songs of interest, also contain other material of no interest to the customer. This can lead to a reluctance to purchase the entire CD, and to reduced sales of the content. Furthermore, if the reluctance to buy is overcome, then having purchased such a CD, an additional problem of convenience arises for the customer who wishes to listen to only certain songs, and who must therefore program their CD player to skip uninteresting tracks.

A further problem arises if a customer wishes to make a special compilation of music, say for a dance party. Current methods involve use of multi-CD players with programmable control facilities, or alternatively, transfer of desired tracks to another medium, for example tape. In the former case, the required equipment is expensive and complex to use, and in the latter case, audio quality suffers from transfer to another medium, and of course there is the issue of copyright infringement.

Considering distribution by means of the Internet, current payment infrastructures are relatively embryonic, and secure methods for content downloading which ensure appropriate compensation to content owners are in their infancy. Portable players using the MP3 standard are available, however these are not yet coupled with any payment infrastructure which can ensure payment of compensation to the content owner.

SUMMARY OF THE INVENTION

The present invention intends to overcome or at least substantially ameliorate some or all of the aforementioned problems.

In one aspect therefore, the invention discloses a system for distributing at least one item from a set of media content items, the system comprising:

the set of media content items;

a portable storage device having at least one user selectable reference pointer to a corresponding media content item in the set; and a vending machine responsive to a signal from the portable storage device, the signal being dependent upon a user selection of the reference pointer, the vending machine being capable of locating the corresponding media content item and reproducing said item on an output medium.

In another aspect, the invention discloses a portable storage device comprising:

at least one user selectable icon;

at least one associated reference pointer to a corresponding media content item in a set of media content items, said reference pointer being responsive to a user selection of the icon.

In yet another aspect, the invention discloses a vending machine adapted for use in a system for distributing at least one item from a set of media content items, the vending machine comprising:

portable storage device input means for receiving a signal from a portable storage device, said signal dependent upon a user selection of a reference pointer on said portable storage device, wherein said reference pointer references a corresponding media content item in the set;

reference pointer processing means for locating the corresponding media content item according to a selected reference pointer;

charging means for attributing a charge to a located media content item;

authorisation means for authorising reproduction of the located media content item depending upon at least a payment by the user; and output medium processing means for reproducing the located media content item on an output medium dependent upon an authorisation from the authorisation means.

In yet a further aspect, the invention discloses a method for distributing at least one item from a set of media content items, the method comprising steps of:

establishing communication between a vending machine and a portable storage device having at least one user selectable reference pointer to a corresponding media content item in the set;

selecting, by the customer, of the reference pointer;

locating, by the machine, according to the reference pointer, the corresponding media content item; and reproducing a located media content item on an output medium.

In still a further aspect, the invention discloses a computer readable medium for storing a program for a system distributing at least one item from a set of media content items, said program comprising:

code for an establishing step for establishing communication between a vending machine and a portable storage device having at least one user selectable reference pointer to a corresponding media content item in the set;

code for a selecting step for selecting, by the customer, of the reference pointer;

code for a locating step for locating, by the machine, according to the reference pointer, the corresponding media content item; and code for a reproducing step for reproducing a located media content item on an output medium.

BRIEF DESCRIPTION OF THE DRAWINGS

A number of preferred embodiments of the present invention will now be described in more detail with reference to the accompanying drawings, in which.

DETAILED DESCRIPTION

In the context of this specification and claims, the terms "smartcard" and "customized smartcard" are used interchangeably throughout the specification. These terms both refer to smartcards having integral microprocessors incorporated therein, these microprocessors being able to detect a user selection signal which is applied to one or more of a plurality of indicia on a surface of the smartcard. By detecting which particular indicia, or combination of indicia, are being selected, the microprocessor is able to perform one or more of a plurality of "actions" in response thereto. The programmability of the smartcard provides flexibility both in the number and placement of the indicia, and also in the actions associated thereto.

Figure 1:
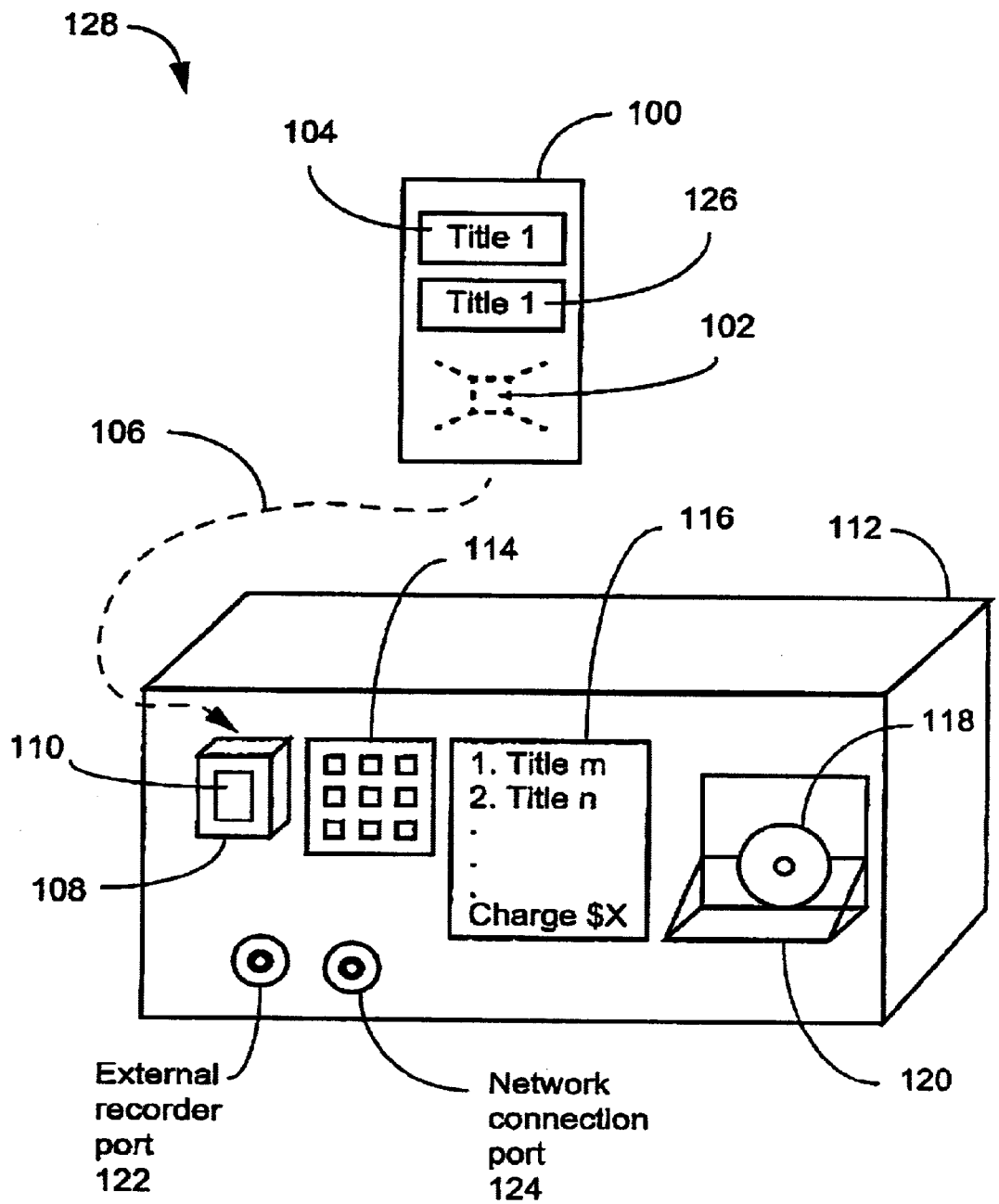
FIG. 1 shows a physical representation of a system in accordance with a preferred embodiment of the invention.

FIG. 1 depicts a first preferred embodiment of the present invention. A customer uses a pre-defined customised smartcard 100 in conjunction with a vending machine 112 to produce a customised output medium such as a CD 118, where the CD contains those media selections which the customer has chosen. This system enables a customer to produce tailored CDs, in this instance, which contain those and only those media content selections which the customer desires. This overcomes the problem of purchasing CDs with unwanted material, and/or having to skip uninteresting tracks while playing the material. By inserting the smartcard 100 into a card reader 108 as depicted by a dashed arrow 106, the customer can press on desired icons 104 on the smartcard 100 through an aperture 110 in the card reader 108. The icons 104, 126 are associated with reference pointers to corresponding media content items, and the association is stored in an on card processor and/or memory 102. By pressing on a particular icon 104, which is associated with a reference pointer for "Grease" by the Bee Gees, the customer can record the desired audio selection onto the CD 118.

Sensing of the user pressing on the icon 104 can, for example, be performed by a touch screen incorporated into the aperture 110. Title 2 (ie. 126), which in the present case has an associated reference pointer to "I am Woman" by Helen Reddy, need not be pressed, if the customer is not interested in that particular piece of music. Therefore, the link between the reference pointers on the smartcard 100 and the output CD 118 is not rigid, but rather at the customer's discretion. By inserting one, or a number, of smartcards 100 a customer can, by pressing icons corresponding to desired content selections only, produce a customised CD 118 which contains only media selections of interest. A keypad 114 provides a user interface whereby control messages including, for example, credit card payment may be effected. A display 116 enables the customer to ensure that the correct designation of desired titles 104 has been made. The display also allows the customer to review an accumulated charge which is to be levied for the selected music selections, prior to final payment. The smartcard 100 can itself also contain some music.

The CD 118 is shown in an output hopper 120, noting that the CD would be produced within the body of the vending machine 112 and only drop into the hopper at completion of the overall process. In alternative embodiments, in addition to, or in place of, the CD 118, an external recording device such as an MP3 recorder can, for example, be connected to an external recorder port 122, enabling the designated media selections to be recorded on this external device. Since MP3 recorders are designed to prevent oncopying to further media, both the CD and the MP3 recorder provide assurance to the content owner that appropriate compensation has been paid for copies of media selections. The vending machine 112 need not contain all possible audio, video and other media content selections, and such content can instead be accessed, via the vending machine 112, on remote servers through a wider network infrastructure by means of a network connection port 124.

Figure 2:
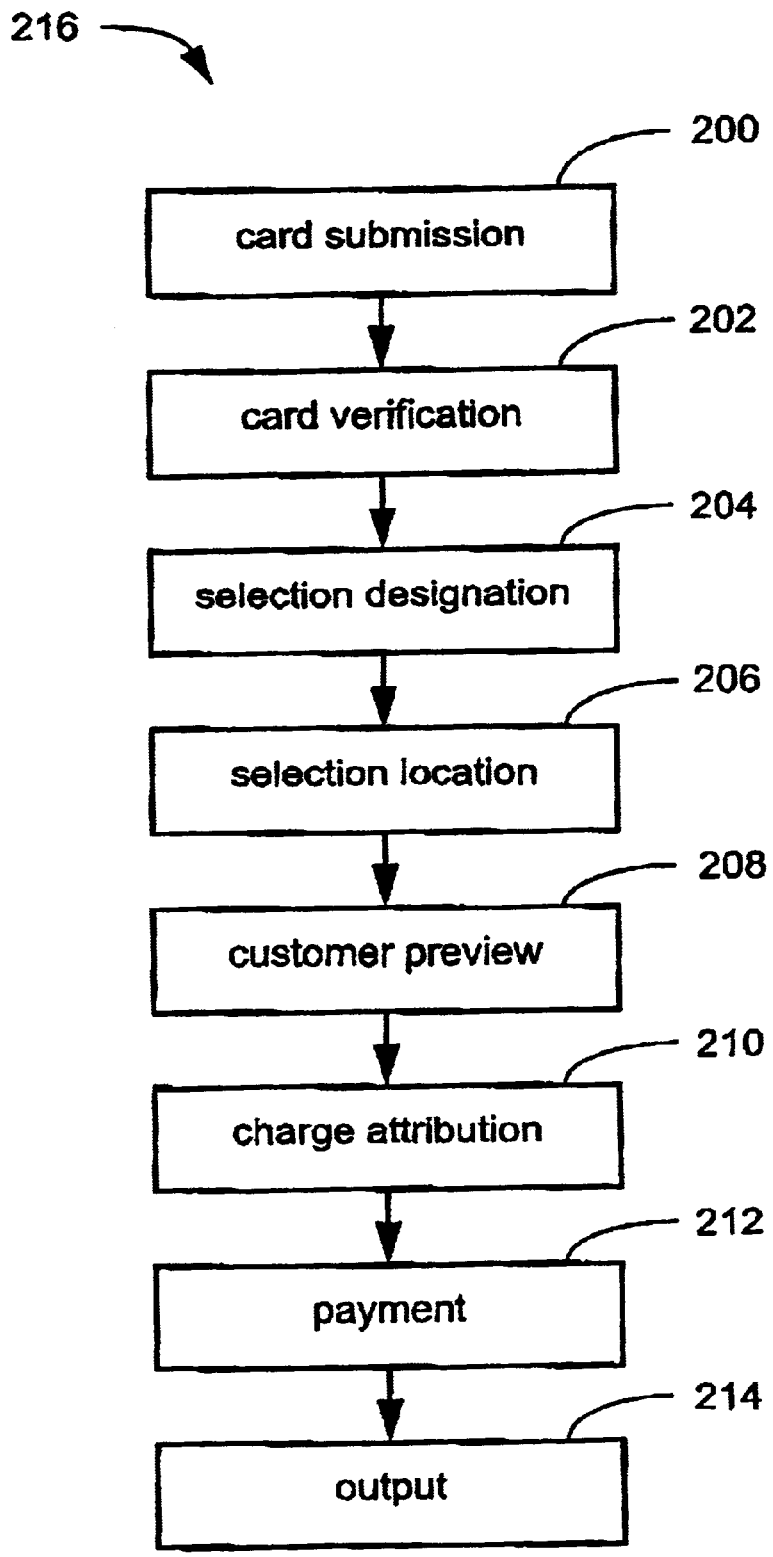
FIG. 2 illustrates a process depicted as a flow diagram of method steps for the system of FIG. 1.

FIG. 2 depicts a process 216, depicted as a flow diagram of method steps for the preferred embodiment. The customer submits the smartcard 100 in the first process step 200, whereupon the vending machine 112 verifies the acceptability of the card in a process step 202. This verification can relate to factors including the availability of a credit balance on a pre-paid smartcard, the applicability of expiry dates on a non pre-paid smartcard, pre-paid smartcards which have been cancelled because of theft, etc. Following the verification step 202, the customer makes one or more designations of desired selections in process step 204, this being performed by pressing on appropriate icons 104 on the card 100. Thereafter, the vending machine 112, making use of the associated reference pointers corresponding to the selections which have been designated by the customer in the step 204, locates the designated selections in a process step 206. As noted with reference to FIG. 1, the desired selections, ie. those having been designated, may be located either locally within the vending machine 112 itself, or externally on remote servers within the broader telecommunications environment which the vending machine can access by means of the network connection port 124.

Having located the desired selections, a customer preview step 208 is performed, whereby a customer is provided with an opportunity to preview the selections which he has designated prior to making a decision to purchase. Thus, for audio selections this would involve a short segment being played for the customer, whereas for video and multi-media clips, a corresponding segment would be played for the customer. The audio speaker and video displays used in providing previews are not shown in FIG. 1.

If the customer decides to proceed with the purchase, a charge attribution step 210 is performed, whereby a relevant charge is attributed to the selection which the customer has designated, this charge having been defined by the content owner and/or the owner's agent. In the customer preview process 208, the customer is provided with the option of terminating the process if the preview is found to be not satisfactory. In the charge attribution process, the customer is similarly provided with a display of the attributed charges, and also with an opportunity to terminate the process if the attributed charges are deemed unacceptable.

Thereafter, in a step 212 payment is made, this of course being on the assumption that the charges in step 210 have been found acceptable by the customer. Payment can be effected in a number of ways. One option is to debit a charge to the smartcard, where the card is of the pre-paid variety. As noted in respect of the verification process 202, a pre-paid card with no credit balance would be rejected at the outset. Alternatively, payment can be effected by means of a cash payment into the vending machine, (payment means not shown in FIG. 1), or alternatively credit card details can be entered by means of the keyboard 114. For credit card transactions, the vending machine 112 conducts a credit transaction with the customer's bank across the telecommunications network via the network connection port 124.

Thereafter, in the output process step 214, the designated selection is output, either by "burning" a CD with the designated selections, or alternatively, by outputting a suitable signal to an external recorder by means of the external port 122.

Figure 3:
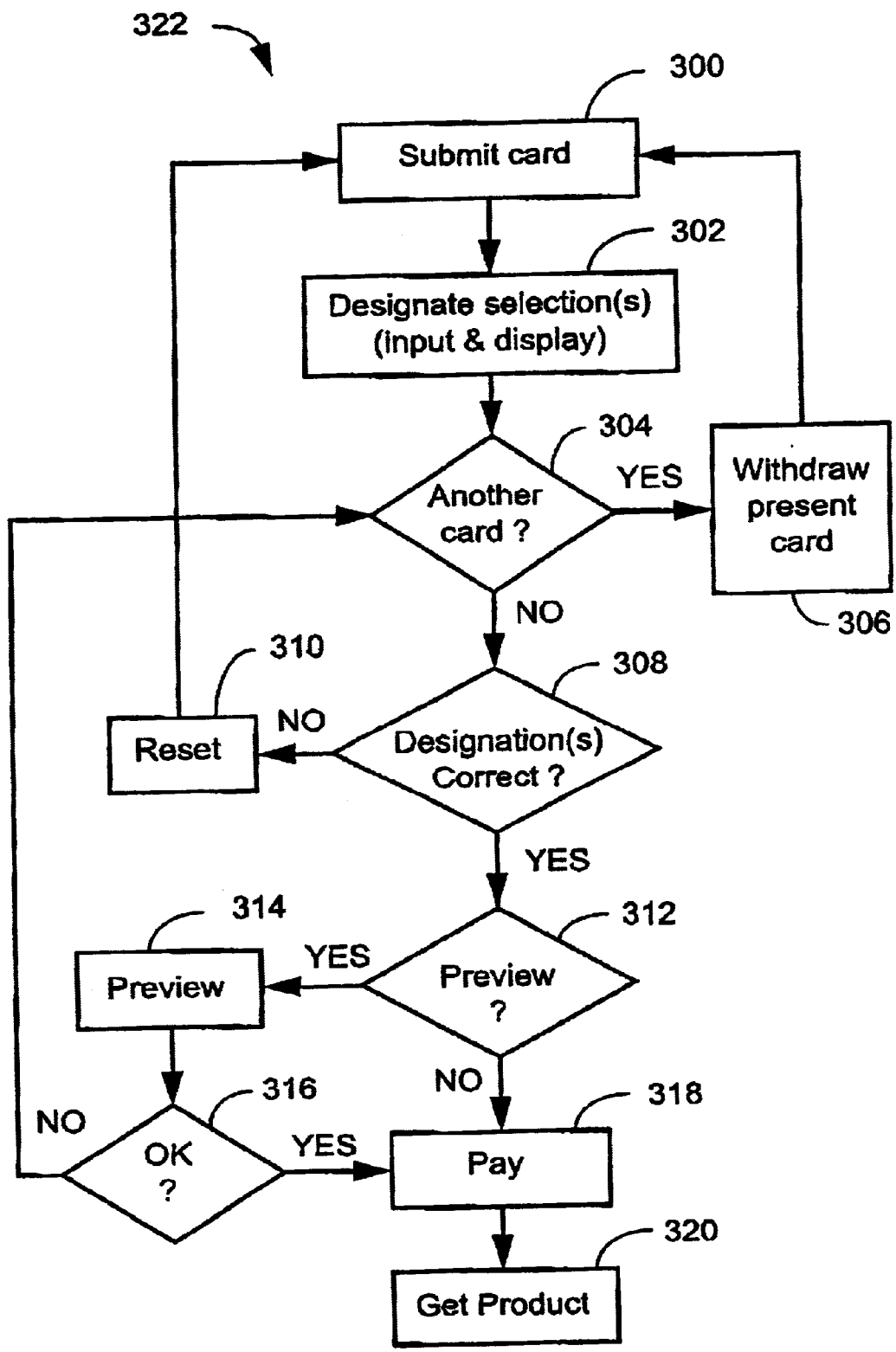
FIG. 3 depicts a process depicted as a flow diagram of method steps from a user perspective for the system of FIG. 1.

FIG. 3 depicts a process 322, depicted as a flow diagram of method steps, from the customer's perspective. The customer submits the smartcard 100 in a step 300, whereafter, providing that the card is not rejected through being considered invalid (not shown, see FIGS. 2, 4), the customer can designate and display titles of desired selections in a step 302. Thereafter, the customer has the option of removing the aforementioned card, in the event that it does not contain all the desired media selections, and may insert additional cards, this option being provided in a step 304. If this option is selected, the present card is withdrawn in a step 306, and the process 322 loops back to submission of the next card in the step 300.

Once all desired cards have been submitted by the customer, and appropriate selections have been designated, the customer is given an opportunity in a step 308 to view the titles of the designated selections (for example, by means of the display 116 in FIG. 1), and to verify their correctness. If the designations are not correct, the process 322 is directed to a reset step 310, and thereafter back to the card submission step 300.

Alternatively, after validating the designations as correct in the step 308, the process 322 is directed to a preview decision step 312, whereby the customer is provided with an option to preview one or more of the designated selections. If this option is taken up, the preview process 314 provides the customer with an opportunity to preview one or more of the designated selections, whereafter an accept/reject step 316 allows the process 322 to either be directed back to the card selection step 304, and thereafter and the display step 308, or alternatively, to continue to a payment step 318. The various payment options have already been described in relation to FIG. 2. After the payment step 318, the product is delivered in the "get product" step 320.

Figure 4:
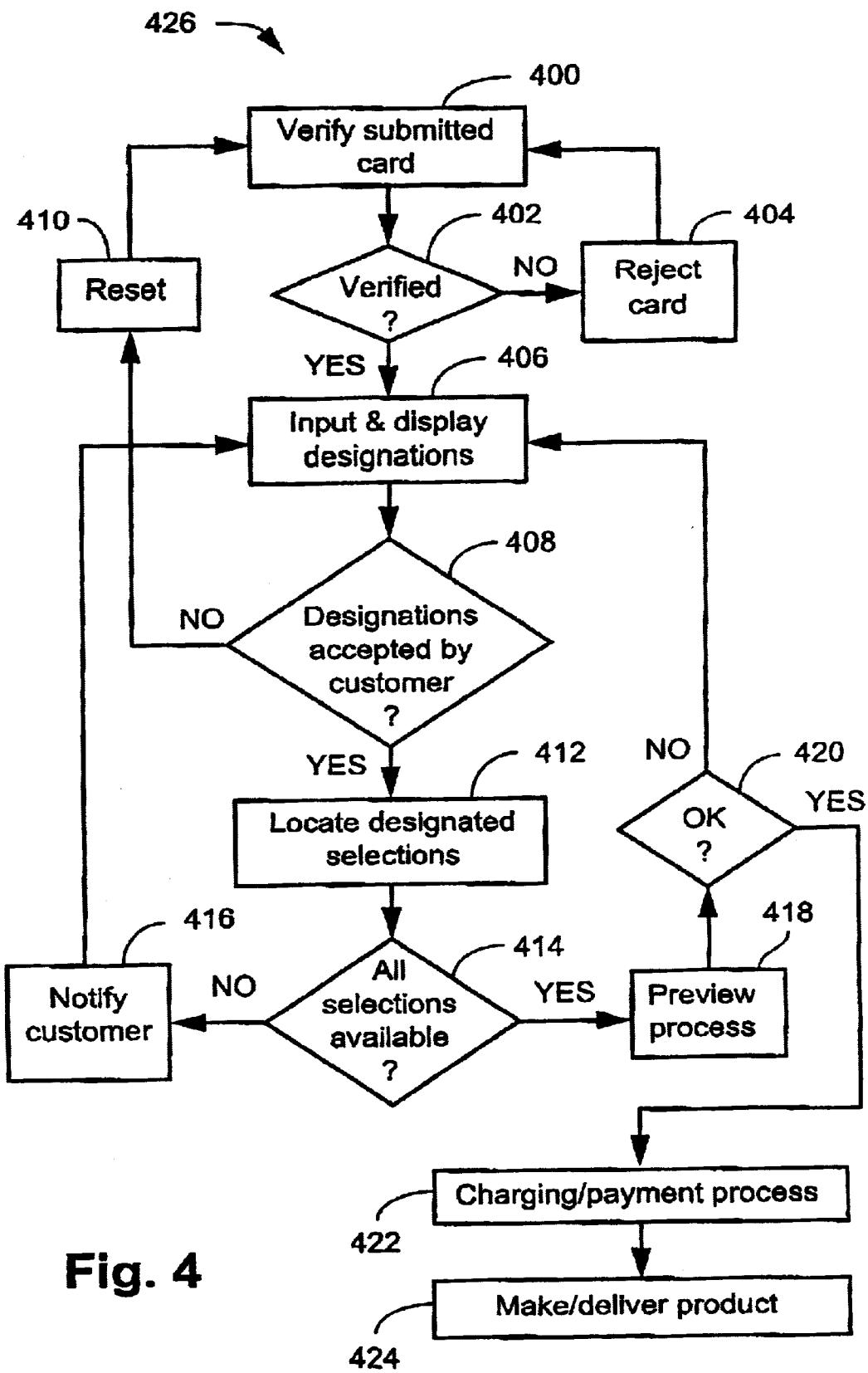
FIG. 4 depicts a further process depicted as a flow diagram of method steps from a system perspective for the system of FIG. 1.

FIG. 4 presents a process 426, depicted as a flow diagram of method steps, from the perspective of the system. In the first instance, the submitted card is verified in a step 400, whereupon a decision step 402 directs the process 426 to reject the card in a step 404 if the relevant particulars of the card are found to be unacceptable. If the card is verified positively, the process 426 is directed to a step 406 where the customer's designations in regard to desired selections are input and displayed. As explained previously, input of the designations is performed by the customer pressing on relevant icons 104 on the smartcard 100, and the display of the designations is presented on the display 116 (see FIG. 1). The customer is provided with the opportunity to review his designations in a decision step 408, whereupon these designations may be rejected, the process 426 then being directed to a reset step 410, and subsequently looping back to the initial step 400.

Alternatively, if the customer accepts the designations in the step 408, the process 426 is directed to a step 412 where those selections, having been designated by the customer, are located. As described in relation to FIG. 2, the designated selections may be found either locally within the vending machine 112 itself, or on remote servers in the broader network which are accessed by means of the network connection port 124.

Thereafter, the process 426 considers, in a step 414, whether all designated selections are available, ie. whether they have all been located. In the event that all designated selections have not been located, the process 426 is directed to a step 416 whereby the customer is notified of this fact. Thereafter, the process 426 is directed back to the input and display step 406, thereby providing the customer with an opportunity to modify the already designated selections. If, on the other hand, all the designated selections are located and found to be available, then the process 426 is directed to a preview process 418, and subsequently to a preview decision process 420. As discussed in regard to FIG. 3, if the customer is dissatisfied with the preview process results, the process 426 is directed back to the input and display process 406. Alternatively, if the previews are found to be satisfactory, the process 426 is directed to a charging/payment process 422. The details of this process 422 are as described previously in regard to FIGS. 2 and 3, as is the subsequent step of making and delivering the product in a step 424.

Figure 5:
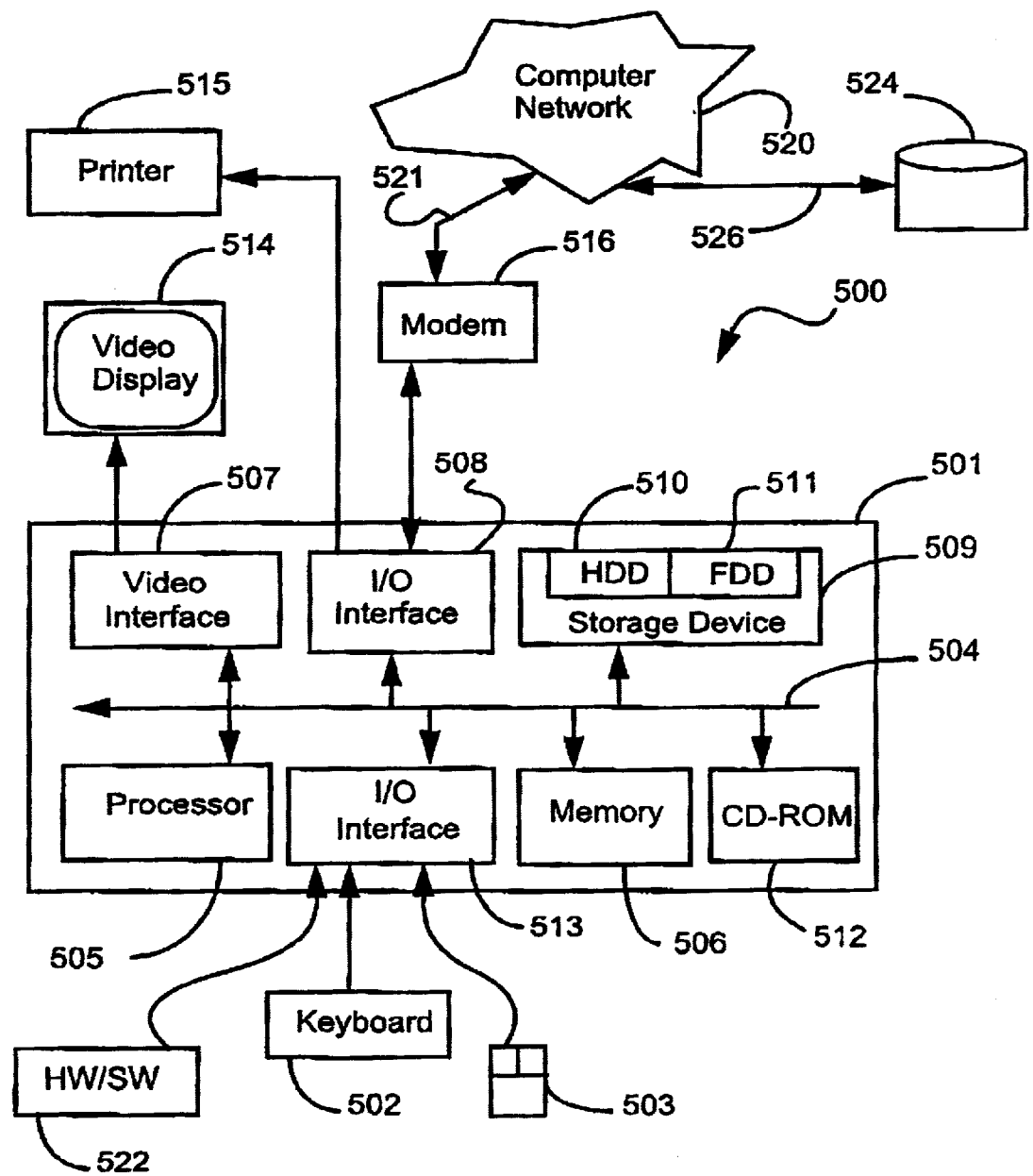
FIG. 5 is a schematic block diagram of a system including a general purpose computer upon which an embodiment of the present invention can be practiced.

The method for distributing at least one item from a set of media content items can be practiced using a conventional general-purpose computer system 500, such as that shown in FIG. 5. The processes of FIGS. 2–4 may be implemented as software, such as an application program executing within the computer system 500. The computer system 500 can communicate with a remote server 524, in which some or all of the set of media content items is warehoused, over a network 520 by means of a connection 526. In particular, the steps of the method of distributing one or more of a first set of audio, video and entertainment media content selections are effected by instructions in the software that are carried out by the computer. The software may be divided into two separate parts, namely one part for carrying out the distributing one or more of a first set of audio, video and entertainment media content selections methods, and another part to manage the user interface between the latter and the user.

The software may be stored in a computer readable medium, including the storage devices described below, for example. The software is loaded into the computer from the computer readable medium, and then executed by the computer. A computer readable medium having such software or computer program recorded on it is a computer program product. The use of the computer program product in the computer preferably effects an advantageous apparatus for distributing one or more of a first set of audio, video and entertainment media content selections in accordance with the embodiments of the invention.

The computer system 500 comprises a computer module 501, input devices such as a keyboard 502 and mouse 503, output devices including a printer 515 and a display device 514. A Modulator-Demodulator (Modem) transceiver device 516 is used by the computer module 501 for communicating to and from a communications network 520, for example connectable via a telephone line 521 or other functional medium. The modem 516 can be used to obtain access to the Internet, and other network systems, such as a Local Area Network (LAN) or a Wide Area Network (WAN).

The computer module 501 typically includes at least one processor unit 505, a memory unit 506, for example formed from semiconductor random access memory (RAM) and read only memory (ROM), input/output (I/O) interfaces including a video interface 507, and an I/O interface 513 for the keyboard 502 and mouse 503 and optionally a joystick (not illustrated), and an interface 508 for the modem 516. The I/O interface 513 also interconnects the computer 500 with specialised hardware/software 522 which is necessary to perform specialised functions including the CD production.

A storage device 509 is provided and typically includes a hard disk drive 510 and a floppy disk drive 511. A magnetic tape drive (not illustrated) may also be used. A CD-ROM drive 512 is typically provided as a non-volatile source of data. The components 505 to 513 of the computer module 501, typically communicate via an interconnected bus 504 and in a manner which results in a conventional mode of operation of the computer system 500 known to those in the relevant art. Examples of computers on which the embodiments can be practised include IBM-PC's and compatibles, Sun Sparcstations or alike computer systems evolved therefrom.

Typically, the application program of the preferred embodiment is resident on the hard disk drive 510 and read and controlled in its execution by the processor 505. Intermediate storage of the program and any data fetched from the network 520 may be accomplished using the semiconductor memory 506, possibly in concert with the hard s disk drive 510. In some instances, the application program may be supplied to the user encoded on a CD-ROM or floppy disk and read via the corresponding drive 512 or 511, or alternatively may be read by the user from the network 520 via the modem device 516.

Still further, the software can also be loaded into the computer system 500 from other computer readable medium including magnetic tape, a ROM or integrated circuit, a magneto-optical disk, a radio or infra-red transmission channel between the computer module 501 and another device, a computer readable card such as a PCMCIA card, and the Internet and Intranets including email transmissions and information recorded on websites and the like. The foregoing is merely exemplary of relevant computer readable mediums. Other computer readable media may be practiced without departing from the scope and spirit of the invention.

The method of distributing one or more of a first set of audio, video and entertainment media content selections may alternatively be implemented in dedicated hardware such as one or more integrated circuits performing the functions or sub functions of distributing one or more of a first set of audio, video and entertainment media content selections. Such dedicated hardware may include graphic processors, digital signal processors, or one or more microprocessors and associated memories.

The foregoing description discloses a number of embodiments of the present invention. Further modifications can be made thereto without departing from the scope of the inventive concept. Thus, for example, although the end-product output media have been described in relation to compact discs and MP3 recorders, the concept is extendable to any output media which supports the functionality described, namely that of ensuring compensation to the content owner by preventing on-copying from the output medium.

Furthermore, the reference pointers used to identify the designated selections can be either proprietary pointers defined within a closed system context, or alternatively can be more generally accepted pointers such as universal reference locaters (URLs) such as are used for designated addresses in the Internet context.

The system as described also supports provision of free downloading of material, in the event that the content owner decides to do so. Therefore, a "zero charge" can be levied within the context of the inventive concept.

The claims defining the invention are as follows:

1. A system for distributing a media content item from a set of media content items, the system comprising:

the set of media content items;

a programmable smartcard having a user selectable icon associated with a reference pointer to the media content item; and a machine adapted to (i) locate the media content item based upon a user selection of the icon, and (ii) reproduce said media content item on an output medium.

2. A system according to claim 1, wherein the set of media content items are warehoused in the machine.

3. A system according to claim 1, wherein at least some of the set of media content items is warehoused remotely, said machine being capable of accessing said at least some of the set over a telecommunications network.

4. A system according to claim 1, wherein the reference pointer is a Universal Resource Locator.

5. A system according to claim 1, wherein a payment by the user for a reproduction is a zero payment.

6. A system according to claim 1, wherein;

the smartcard is pre-paid; and a payment by the user for the reproduction is debited directly to the smartcard.

7. A system according to claim 1, wherein a payment by the user for the reproduction is at least one of a cash and a credit card payment.

8. A system according to claim 1, wherein said output medium is a machine-readable medium.

9. A machine adapted for use in a system for distributing a media content item from a set of media content items, the machine comprising:

programmable smartcard input means for detecting a user selection of a user selectable icon on said programmable smartcard, wherein a reference pointer references the media content item;

reference pointer processing means for locating the media content item according to the reference pointer;

charging means for attributing a charge to the located media content item;

authorisation means for authorising reproduction of the located media content item depending upon at least a payment by the user; and output medium processing means for reproducing the located media content item on an output medium dependent upon an authorisation from the authorisation means.

10. A machine according to claim 9, further comprising:

warehousing means for the set of media content items.

11. A machine according to claim 9, further comprising:

communication means for accessing the media content item over a telecommunications network.

12. A machine according to claim 9, further comprising:

recording means for recording an itemised charge for said located media content item; and display means for displaying at least one of the itemised charge and a total charge for said located media content item.

13. A machine according to claim 9, further comprising:

preview means for providing a preview of said media content item.

* * * * *